United States Patent Office 3,350,392
Patented Oct. 31, 1967

3,350,392
PROCESS FOR THE SEPARATION OF ω-DODECA-LACTAM AND CYCLODODECANECARBOXYLIC ACID FROM MIXTURES THEREOF IN SULFURIC ACID
Hans-Joachim Schultze and Clau Berther, Chur, Graubunden, Switzerland, assignors to Inventa A.G., für Forschung und Patentverwertung, Zurich, Switzerland
No Drawing. Filed June 8, 1964, Ser. No. 373,579
Claims priority, application Switzerland, June 6, 1963, 7,121/63
1 Claim. (Cl. 260—239.3)

The invention relates to a process for the separation of ω-dodecalactam from cyclododecanecarboxylic acid, present together in mixture with sulfuric acid, and, more particularly, to such a separation process in a simple manner with the aid of dilute ammonia solutions.

As is known, when cyclododecanecarboxylic acid is reacted with nitrosating agents, in particular nitrosylsulfuric acid or sulfuric acid-dinitrogen trioxide mixtures, in the presence of concentrated sulfuric acid or oleum at elevated temperatures, a mixture of sulfuric acid, ω-dodecalactam and cyclododecanecarboxylic acid in amounts varying according to the reaction conditions, is obtained in a single operational step which includes the nitrosation at the tertiary carbon atom, the decarboxylation of the nitrosocarboxylic acid to yield cyclododecanoneoxime and the Beckmann rearrangement thereof.

These reaction products can be refined in various ways. Normally, this is done by simple neutralization, thereby dissolving the cyclododecanecarboxylic acid, with dilute alkali metal hydroxide or carbonate solutions after previous precipitation of the cyclododecanecarboxylic acid-ω-dodecalactam mixture by means of considerable dilution of the sulfuric acid reaction mixture with water and ice. The ω-dodecalactam is not dissolved and can easily be separated by filtration or extraction. However, the precipitation may also be carried out in accordance with our co-pending application Ser. No. 366,621, filed May 11, 1964, in such manner that the sulfuric acid, normally of 100% strength, which contains the ω-dodecalactam-cyclododecane-carboxylic acid mixture, first is diluted in water to the point where the sulfuric acid has a concentration of approximately 75 percent. Under these conditions, the cyclododecanecarboxylic acid is practically insoluble in the mixture, thus is precipitated, and can be removed by filtration. By further dilution of the mixture with water, the solubility of the dodecalactam finally also is reduced to such an extent that, at a sulfuric acid concentration of 20–30 percent, it is likewise precipitated quantitatively.

The drawbacks of the processes described above consist in that, on the one hand, large amounts of alkali sulfates are obtained as by-products and, on the other hand, that the dodecalactam obtained is, while relatively pure, nevertheless accompanied by impurities having a discoloring effect.

It has now been found that the neutralization and thus, the solubilization of the cyclododecanecarboxylic acid can be accomplished in a simple manner when dilute aqueous ammonia solution is employed. Attempts at employing concentrated ammonia solutions for neutralizing the cyclododecanecarboxylic acid in order to dissolve the carboxylic acid and to isolate the ω-dodecalactam have met with failure because of too low a solubility of the cyclododecanecarboxylic acid in concentrated ammonia. Table 1 below gives details of the solubility conditions of cyclododecanecarboxylic acid in ammonia of various concentrations and at various temperatures.

TABLE 1

| Temperature, °C. | NH₃ concentration | Grams cyclododecanecarboxylic acid in 100 ml. solution |
|---|---|---|
| 20 | 5 | 3.28 |
| 20 | 10 | 2.30 |
| 20 | 15 | 2.10 |
| 20 | 20 | 1.56 |
| 20 | 25 | 1.09 |
| 30 | 5 | 16.01 |
| 30 | 10 | 56.59 |
| 30 | 15 | 3.83 |
| 30 | 20 | 2.85 |
| 40 | 5 | 29.62 |
| 40 | 10 | 24.28 |
| 40 | 15 | 11.86 |
| 40 | 20 | 5.41 |

The process according to the invention for separating ω-dodecalactam-cyclododecanecarboxylic acid - sulfuric acid mixtures is characterized in that the rearrangement mixture of ω-dodecalactam, cyclododecanecarboxylic acid and sulfuric acid or oleum obtained by nitrosation of cyclododecanecarboxylic acid in sulfuric acid or oleum is diluted with water to such an extent that the sulfuric acid concentration is less than 30 percent by weight, the precipitated mixture of dodecalactam and cyclododecanecarboxylic acid is filtered off, the mixture then washed neutral and made into a suspension with aqueous ammonia at elevated temperatures. The insoluble dodecalactam then is separated by filtration or extraction from the cyclododecanecarboxylic acid dissolved in the form of its ammonium salt (ammonium cyclododecanate).

A particular advantage of this process consists in that the dilute ammoniacal solution of the cyclododecanecarboxylic acid exerts only an extremely slight solubilizing effect on the ω-dodecalactam, so that the latter can be isolated from the mixture by filtration almost quantitatively and in good quality. Furthermore, the ammonium salt of the cyclododecanecarboxylic acid has the property, when heated to temperatures above 50° C., and in particular at 90–100° C., of splitting off ammonia in the dry state or in aqueous solution and in particular under reduced pressure, so that the free cyclododecanecarboxylic acid is recovered. Hence, the possibility is afforded of using the cyclododecanecarboxylic acid over again without further refining steps for nitrosation and rearrangement and of recycling the ammonia, whereby the cost of the process for producing ω-dodecalactam is reduced considerably, i.e., in the process according to the invention no non-returnable by-products or by-products which can be used further only at special expense are obtained.

The process according to the invention is carried into effect in such manner that the solution of the ω-dodecalactam and the excess cyclododecanecarboxylic acid in concentrated sulfuric acid, obtained after the nitrosation, decarboxylation and Beckmann rearrangement, and possibly containing free sulfur trioxide (if oleum has been used for the rearrangement), is diluted while cooling with water to a sulfuric acid concentration of less than 30 percent by weight, whereby both the ω-dodecalactam and the cyclododecanecarboxylic acid are precipitated completely in the form of a readily filterable precipitate.

After the filter cake has been washed neutral, it is made into a suspension at elevated temperature, preferably at 30–50° C., with aqueous ammonia containing up to 15 percent free $NH_3$, but preferably only 5–10 percent. The amount of ammonia to be used is larger than would correspond to the stoichiometric proportion to the cyclododecanecarboxylic acid present.

It has been established that an excess of free ammonia is necessary to dissolve a given amount of carboxylic acid. Furthermore, as is apparent from Table I, the temperature is of decisive importance as regards the proportion of ammonia to dissolved cyclododecanecarboxylic acid. The carboxylic acid dissolves in a short time, whereas the ω-dodecalactam remains undissolved in a more or less fine-grained form according to the working conditions and can be removed from the solution by filtration or extraction with benzene or lower halohydrocarbons such as, for example, carbon tetrachloride, chloroform or methylene chloride. It is also feasible to separate the ω-dodecalactam from the cyclododecanecarboxylic acid without previous precipitation from the dilute sulfuric acid. In this case, the sulfuric acid is also neutralized, which, of course, leads to a considerable decrease of the solubility of the cyclododecanecarboxylic acid in the dilute ammonia. Moreover, the advantage of the feasibility of returning the ammonia no longer fully applies, since a large proportion of ammonia is combined in the form of ammonium sulfate. Table 2 gives an idea of the solubility conditions of cyclododecanecarboxylic acid in 5 percent aqueous ammonia in the presence of 5 percent by weight of ammonium sulfate.

TABLE 2

| Temperature, °C.: | Grams cyclododecanecarboxylic acid in 100 ml. 5% $NH_3$ and 5% $(NH_4)_2SO_4$ |
|---|---|
| 20 | 0.515 |
| 30 | 0.642 |
| 40 | 5.542 |

After filtration or extraction of the ω-dodecalactam from the dilute ammoniacal cyclododecanecarboxylic acid, the remaining solution is briefly heated to boiling, most advantageously while simultaneously applying a pressure below atmospheric. In this process the ammonium salt of the cyclododecanecarboxylic acid is decomposed and splits off ammonia which escapes or can be used again after absorption in water. When all the ammonia has been expelled from the solution, heating of the solution can be terminated. On cooling of the solution, the cyclododecanecarboxylic acid is precipitated in a flocculent, colorless and readily filterable form. After drying, this acid can be used again immediately for nitrosation without further purification. The ammonium salt solution can also be evaporated to dryness, and the cyclododecanecarboxylic acid recovered as a residue. In this case, of course, it contains all the impurities previously contained in the solution, so that, before the acid is reused, purification may become necessary.

The invention now will be further explained by the following examples. However, it should be understood that these are given merely by way of illustration, and not of limitation, and that numerous changes may be made in the details without departing from the spirit of the invention as hereinafter claimed.

*Example 1*

A mixture consisting of 14.75 g. ω-dodecalactam and 14.75 g. cyclododecanecarboxylic acid was dissolved in 30 ml. 100% sulfuric acid. This mixture corresponded proportionately to a rearrangement mixture obtained on the reaction of cyclododecanecarboxylic acid with nitrosating agents in the presence of concentrated sulfuric acid or oleum.

By slowly introducing this mixture into cooled water, while simultaneously stirring intensively, both the ω-dodecalactam and also the cyclododecanecarboxylic acid were precipitated. The precipitate was separated by filtration, washed neutral with water and introduced into 100 ml. 5% aqueous ammonia solution. By stirring and heating to 40–50° C., the dissolution of the cyclododecanecarboxylic acid occurred within 15 minutes. The insoluble ω-dodecalactam thereafter was separated by filtration, washed neutral and dried.

14.25 g. dodecalactam with a melting point of 151–152° C. were obtained, corresponding to a yield of 96.5% of theory.

The ammoniacal mother liquor thereupon was heated to boiling for 15 minutes under reduced pressure (50–100 mm. Hg). After this, no further splitting off of ammonia could be observed, the originally clear aqueous solution had become cloudy and on cooling of the solution the cyclododecanecarboxylic acid precipitated in flocculent form. After filtering, 14.8 g. cyclododecanecarboxylic acid were left in the form of a colorless, finely crystalline powder having a melting point of 91° C., corresponding to a yield of 100.05% (error limit).

*Example 2*

A reaction mixture obtained from cyclododecanecarboxylic acid by nitrosation and rearrangement was diluted with cold water until all the dodecalactam and all cyclododecanecarboxylic acid had been precipitated. The precipitated products were filtered off and washed neutral. They amounted to 1500 g. (dry weight). The moist mixture was mixed for 30 minutes at 40° C. with 2.9 liters of 5% aqueous ammonia. The further recovery of the products was effected in accordance with the method described in Example 1. 705 g. ω-dodecalactam, having a melting point of 151° C., and 758 g. cyclododecanecarboxylic acid having a melting point of 91.5° C. were obtained.

We claim as our invention:

A process for the separation of omegadodecalactam and cyclododecanecarboxylic acid from each other and practically complete recovering of each of them in substantially pure form, present in mixture with each other and with a substance selected from the group consisting of concentrated sulfuric acid and oleum, said mixture being obtained in the nitrosation of cyclododecane carboxylic acid, which comprises diluting said mixture with water to a sulfuric acid concentration of less than 30 percent by weight; filtering the blend of dodecalactam and cyclododecane-carboxylic acid thus precipitated; washing the same neutral with water; making a suspension of said washed blend in 5–10 percent aqueous ammonia at 30°–50° C., thereby forming soluble ammonium cyclododecanate and insoluble dodecalactam; separating the latter, recovering the cyclo-dodecane-carboxylic acid from the solution of its ammonium salt by briefly heating the solution to boiling under a pressure of 50 to 100 mm. Hg, and precipitating the acid by means of cooling; the splitoff ammonia being collected in water and reused.

References Cited

UNITED STATES PATENTS 3,200,112   8/1965   Muench et al. _____ 260—239.3

FOREIGN PATENTS 1,309,715   10/1962   France.

WALTER A. MODANCE, *Primary Examiner.*

ROBERT T. BOND, *Assistant Examiner.*